United States Patent
Liao et al.

(10) Patent No.: US 11,765,404 B2
(45) Date of Patent: Sep. 19, 2023

(54) SYSTEMS, METHODS, AND DEVICES FOR ENABLING LIVE MEDIA PRODUCTION SERVICES

(71) Applicant: Apple Inc., Cupertino, CA (US)

(72) Inventors: Ching-Yu Liao, Portland, OR (US); Ozgur Oyman, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/288,830

(22) PCT Filed: Oct. 25, 2019

(86) PCT No.: PCT/US2019/058177
§ 371 (c)(1),
(2) Date: Apr. 26, 2021

(87) PCT Pub. No.: WO2020/092174
PCT Pub. Date: May 7, 2020

(65) Prior Publication Data
US 2021/0360294 A1    Nov. 18, 2021

Related U.S. Application Data

(60) Provisional application No. 62/755,386, filed on Nov. 2, 2018.

(51) Int. Cl.
*H04N 21/2187* (2011.01)
*H04L 41/5054* (2022.01)
(Continued)

(52) U.S. Cl.
CPC ......... *H04N 21/2187* (2013.01); *G16Y 10/65* (2020.01); *H04L 41/509* (2013.01);
(Continued)

(58) Field of Classification Search
CPC .......... H04N 21/2187; H04N 21/2347; H04N 21/6131; H04L 41/5019; H04L 41/5054; H04L 41/509; H04L 67/20
See application file for complete search history.

(56) References Cited

U.S. PATENT DOCUMENTS

| | | | |
|---|---|---|---|
| 11,039,044 B2 * | 6/2021 | Kniffen | H04N 5/77 |
| 2015/0373258 A1 * | 12/2015 | Chuang | H04N 5/23222 |
| | | | 348/333.04 |

(Continued)

FOREIGN PATENT DOCUMENTS

| KR | 1020120068944 A | 6/2012 |
|---|---|---|
| WO | 2017197273 A1 | 11/2017 |

OTHER PUBLICATIONS

3GPP TR 26.891, "3rd Generation Partnership Project; Technical Specification Group Services and System Aspects; 5G enhanced mobile broadband; Media distribution (Release 15)", V1.2.0, Jul. 2017, 40 pages.

(Continued)

*Primary Examiner* — Nnenna N Ekpo
(74) *Attorney, Agent, or Firm* — Dorsey & Whitney LLP

(57) ABSTRACT

A live media production function (LMPF) provisions a live media production service and live media service in a 5G system. The LMPF may be deployed as a virtual or physical network function in a 5G network or as an application function interfacing with the 5G network over a standardized interface.

19 Claims, 14 Drawing Sheets

(51) Int. Cl.
  *H04L 41/50* (2022.01)
  *H04N 21/2347* (2011.01)
  *H04N 21/61* (2011.01)
  *G16Y 10/65* (2020.01)
  *H04L 41/5019* (2022.01)
  *H04L 67/53* (2022.01)

(52) U.S. Cl.
  CPC ...... *H04L 41/5019* (2013.01); *H04L 41/5054* (2013.01); *H04L 67/53* (2022.05); *H04N 21/2347* (2013.01); *H04N 21/6131* (2013.01)

(56) References Cited

U.S. PATENT DOCUMENTS

| | | | |
|---|---|---|---|
| 2017/0064240 A1* | 3/2017 | Mangat | A63F 13/212 |
| 2018/0192390 A1* | 7/2018 | Li | H04W 80/10 |
| 2018/0317157 A1* | 11/2018 | Baek | H04W 48/18 |
| 2019/0124617 A1* | 4/2019 | Jones | H04W 64/003 |
| 2019/0200872 A1* | 7/2019 | Matsuoka | A61B 5/0013 |

OTHER PUBLICATIONS

3GPP TS 23.502, "3rd Generation Partnership Project; Technical Specification Group Services and System Aspects; Procedures for the 5G System; Stage 2 (Release 15)", V15.3.0, Sep. 2018, 330 pages.
PCT/US2019/058177, International Search Report and Written Opinion, dated Feb. 14, 2020, 11 pages.

\* cited by examiner

SYSTEMS, METHODS, AND DEVICES FOR ENABLING LIVE MEDIA PRODUCTION SERVICES

CROSS-REFERENCE TO RELATED APPLICATION(S)

This application is a national stage filing under 35 U.S.C. § 371 of International Patent Application No. PCT/US2019/058177, filed Oct. 25, 2019, which claims the benefit of U.S. Provisional Application No. 62/755,386, filed Nov. 2, 2018, each of which is hereby incorporated by reference herein in its entirety.

TECHNICAL FIELD

This application relates generally to wireless communication systems, and more specifically to a live media production function.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

3GPP has started the study on a 5G system (5GS) to support real-time audio/video (A/V) production (see, e.g., 3GPP TR 22.827). This present proposal focuses on providing immersive media service which relies on real-time media production function in the 5G System. The proposed solutions are largely based on the system architecture for non-public network and private slice in a public land mobility network (PLMN) in 3GPP TR 23.734, 3GPP TS22.261, and 3GPP TR22.830.

Embodiments disclosed herein provide solutions to provision live media service in a 5G system.

An example use case of certain embodiments is to support real-time A/V production in sport events. According to statistics report, broadcast revenue from the Summer Olympic Games for the 2016 Olympics in Athens was at about 1.5 billion U.S. dollars. In recent years, immersive media applications have attracted attention and made some technical breakthroughs, e.g. freepoint/FreeD technologies, and improving computing powers. In the Olympics and other sporting events, the immersive media services can be provided to audiences at the scene or to remote audiences all over the world. On the other hand, such services would be potential business opportunities for multiple operators including mobile network operators (MNOs), third parties, and production vendors.

The nature of flexibility and virtualization in 5GS and the support of network slicing and non-public network make the support of live immersive media services possible to overcome deployment challenges for MNOs and third parties. However, open issues in 5GS for provisioning live media services include determining how the 5GS supports: live media production; temporary deployment in a limited time subscription; and multiple operators to provision the live media service to the subscribers (e.g., audiences at the scene or remote sites wherein the audiences may not have a live media service subscription from their original PLMN services or non-public network service).

Thus, certain embodiments herein provide an A/V live production framework in 5GS. Certain such embodiments may provide a new physical/virtual network function, live media production function (LMPF) in 5GS, in which the network function is operated in a specific location and in a limited time. The LMPF may include three logical functions: media acquisition; media production; and media distribution. Embodiments may also provide media acquisition to allow the LMPF to remotely interact with devices with UE capabilities for capturing the requested medias. In addition, or in other embodiments, media distribution allows audiences to subscribe to the live media services in a limited time manner, in which the audiences at the scene and/or at remote sites can enable the service in a specific location (to subscribe services from the non-public network and MNOs) and specific time.

Figure 1:
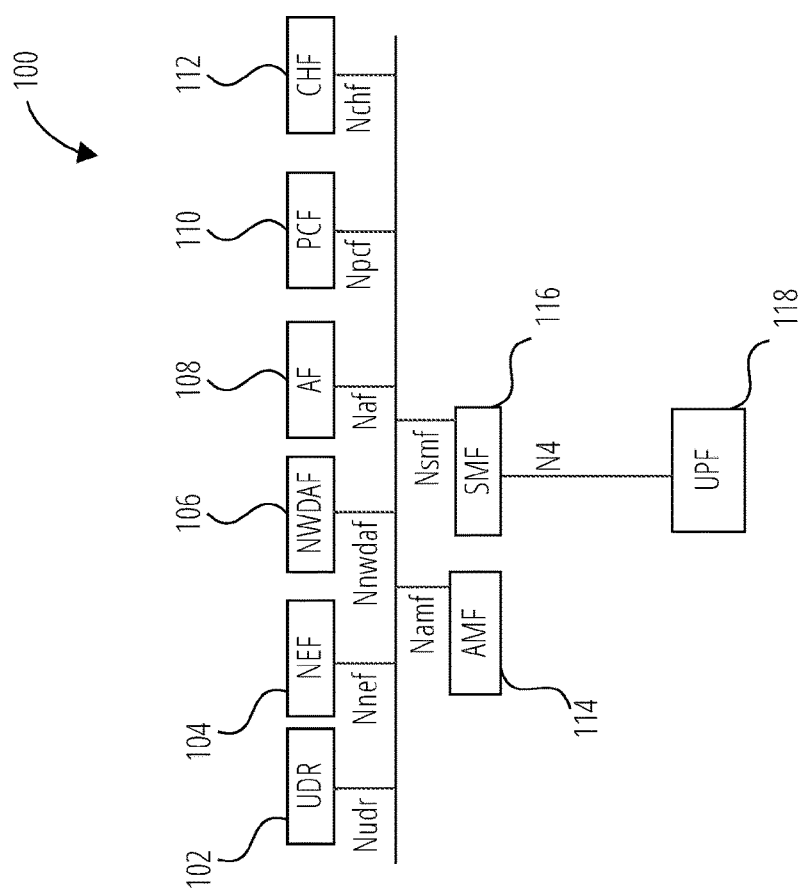
FIG. 1 illustrates a service based representation of an overall architecture for a policy and charging control framework in accordance with one embodiment.

By way of introduction, FIG. 1 illustrates a service based representation 100 of an overall architecture for a policy and charging control framework for 5GS according to one embodiment. As described in 3GPP TS 23.503, the service based representation 100 comprises the functions of the Policy Control Function (shown as PCF 110), the Session Management Function (shown as SMF 116), the User Plane Function (shown as UPF 118), the Access and Mobility Management Function (shown as AMF 114), the Network Exposure Functionality (shown as NEF 104), the Network Data Analytics Function (shown as NWDAF 106), the Charging Function (shown as CHF 112), the Application Function (shown as AF 108) and a Unified Data Repository (shown as UDR 102). FIG. 1 also shows the corresponding interfaces including Nudr, Nnef, Nnwdaf, Naf, Npcf, Nchf, Namf, and Nsmf. An N4 reference point may not be part of the 5G policy framework, but is shown for completeness.

Figure 2:
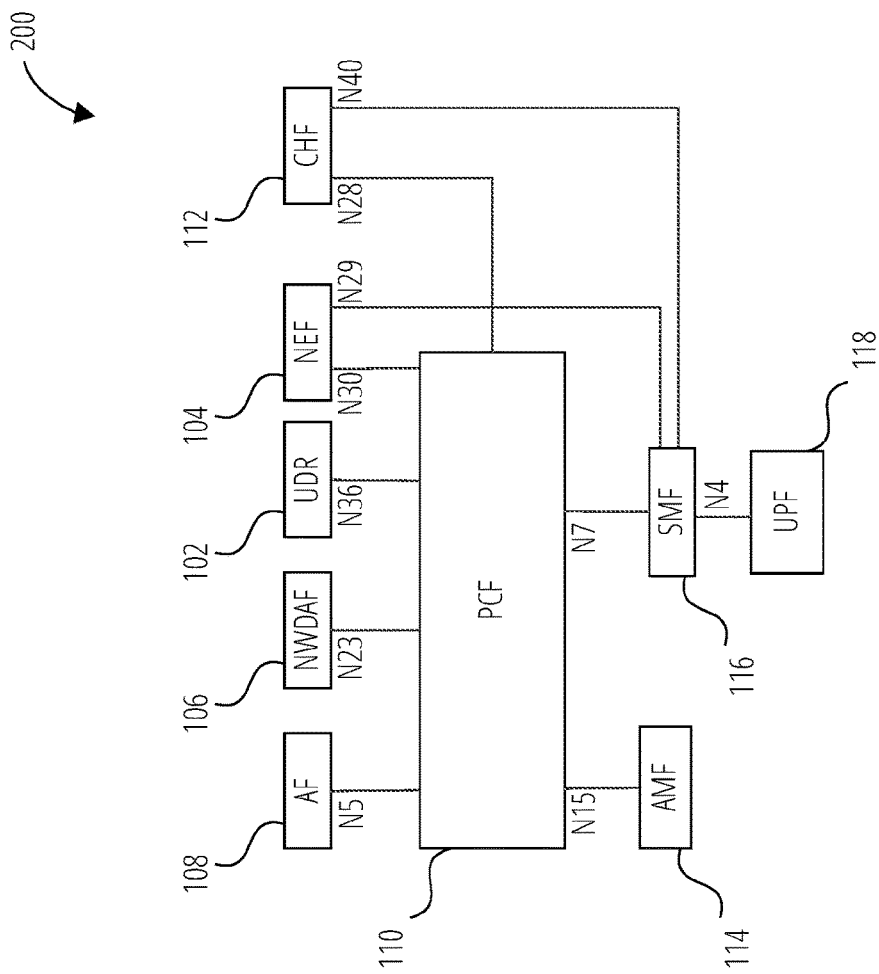
FIG. 2 illustrates a reference point representation of an overall architecture for a policy and charging control framework in accordance with one embodiment.

FIG. 2 illustrates a reference point representation 200 of an overall architecture for a policy and charging control framework for 5GS according to one embodiment. As described in 3GPP TS 23.503, the reference point representation 200 comprises the functions of the PCF 110, the SMF 116, the UPF 118, the AMF 114, the NEF 104, the as NWDAF 106, the CHF 112, the AF 108 and the UDR 102. FIG. 2 also shows the corresponding reference points N5, N23, N36, N30, N29, N28, N40, N15, N7, and N4. The N4 reference point may not be part of the 5G policy framework, but is shown for completeness.

Figure 3:
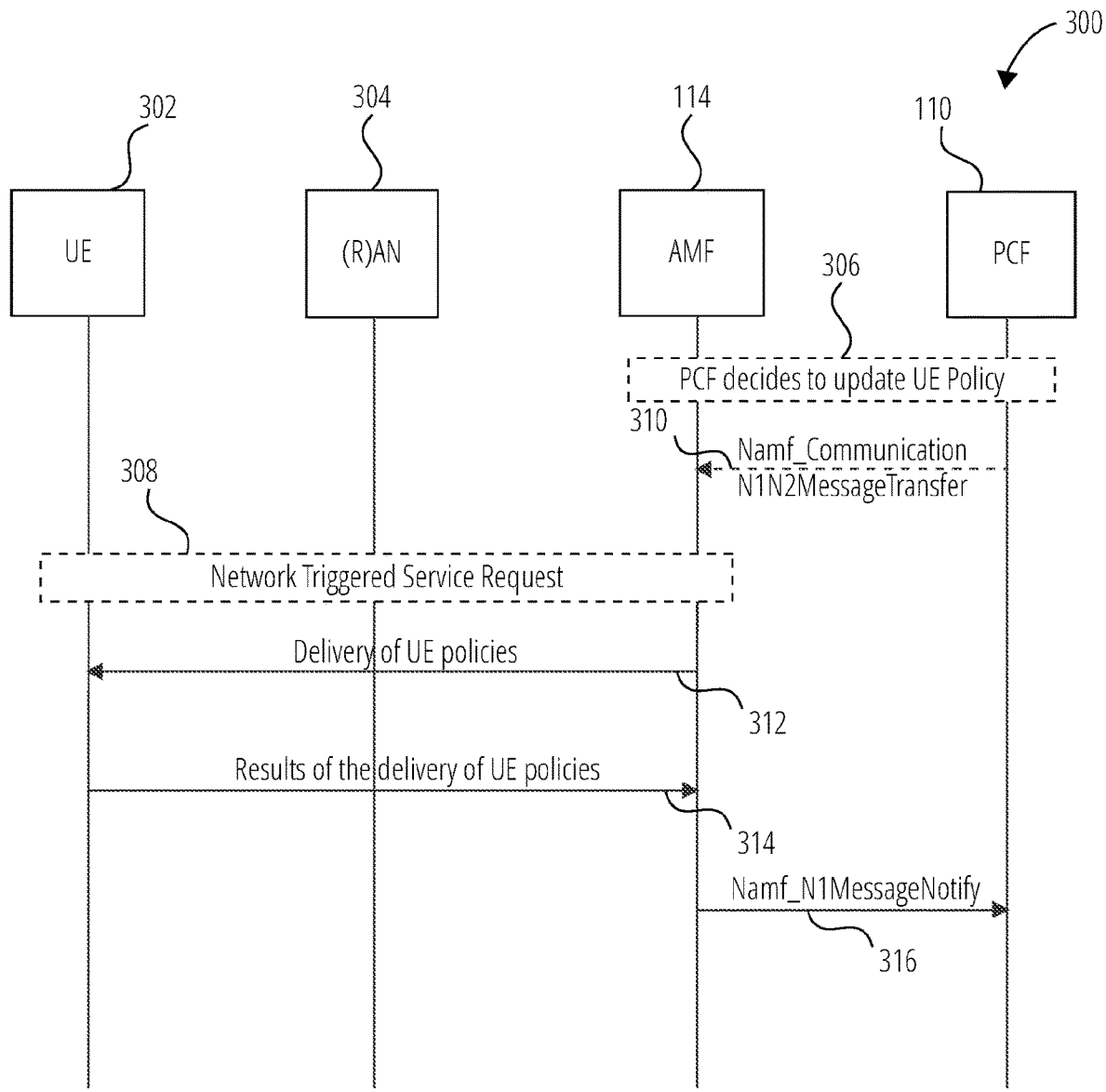
FIG. 3 illustrates a UE configuration update procedure in accordance with one embodiment.

In certain embodiments, UE policy can be delivered to a UE in a UE configuration update procedure initiated by an access and mobility management function (AMF) or a policy control function (PCF). For example, FIG. 3 illustrates an example UE configuration update procedure 300 according to one embodiment. The UE configuration update procedure 300 includes cooperation between a UE 302, a RAN or other access network (shown as (R)AN 304), an AMF 114, and a PCF 110. The UE configuration update procedure 300 is initiated when the PCF 110 decides to update UE policy 306. The PCF 110 may decide to update the UE 302 access selection and protocol data unit (PDU) session selection related policy information (i.e., UE policy) in the UE configuration. In the non-roaming case, the visited PCF (V-PCF) is not involved and the role of the home PCF (H-PCF) is performed by the PCF. For the roaming scenarios, the V-PCF interacts with the AMF 114 and the H-PCF interacts with the V-PCF. The PCF 110 may decide to update the UE policy procedures based on triggering conditions such as an initial registration, registration with 5G system (5GS) when the UE moves from evolved packet system (EPS) to 5GS, or updates UE policy.

For example, for the case of initial registration and registration with 5GS when the UE 302 moves from EPS to 5GS, the PCF 110 compares the list of public service identifiers (PSIs) included in the UE access selection and PDU session selection related policy information in Npcf_UEPolicyControl_Create request and determines whether UE access selection and PDU session selection related policy information are to be updated and provided to the UE 302 via the AMF 114 using a DL NAS TRANSPORT message. As another example, for the network triggered UE policy update case (e.g., the change of UE location, the change of subscribed single network slice selection assistance information (S-NSSAI) as described in clause 6.1.2.2.2 of 3GPP TS 23.503), the PCF 110 checks the latest list of PSIs to decide which UE access selection and/or PDU session selection related policies to send to the UE 302.

The PCF 110 may check if the size of the resulting UE access selection and PDU session selection related policy information exceeds a predefined limit. If the size is under the limit, then UE access selection and PDU session selection related policy information are included in a single Namf_Communication_N1N2MessageTransfer service operation 310 as described below. If the size exceeds the predefined limit, the PCF 110 splits the UE access selection and PDU session selection related policy information in smaller, logically independent UE access selection and PDU session selection related policy information ensuring the size of each is under the predefined limit. Each UE access selection and PDU session selection related policy information may then be sent in a separate Namf_Communication_N1N2MessageTransfer service operation 310 as described below.

The NAS messages from the AMF 114 to the UE 302 may not exceed the maximum size limit allowed in NG-RAN (PDCP layer), so the predefined size limit in PCF 110 may be related to that limitation. The mechanism used to split the UE access selection and PDU session selection related policy information is described in 3GPP TS 29.507.

The PCF 110 invokes the Namf_Communication_N1N2MessageTransfer service operation 310 provided by the AMF 114. The message may include SUPI and a UE policy container.

In a network triggered service request 308, if the UE 302 is registered and reachable by the AMF 114 in either 3GPP access or non-3GPP access, the AMF 114 transfers transparently the UE policy container to the UE 302 via the registered and reachable access. If the UE 302 is registered in both 3GPP and non-3GPP accesses and reachable on both access and served by the same AMF 114, the AMF 114 transfers transparently the UE policy container to the UE 302 via one of the accesses based on the AMF local policy. If the UE 302 is not reachable by AMF over both 3GPP access and non-3GPP access, the AMF 114 reports to the PCF 110 that the UE policy container could not be delivered to the UE 302 using Namf_Communication_N1N2TransferFailureNotification.

If the AMF 114 decides to transfer transparently the UE policy container to the UE 302 via 3GPP access, e.g. the UE 302 is registered and reachable by AMF in 3GPP access only, or if the UE 302 is registered and reachable by AMF in both 3GPP and non-3GPP accesses served by the same AMF and the AMF 114 decides to transfer transparently the UE policy container to the UE 302 via 3GPP access based on local policy, and the UE 302 is in CM-IDLE and reachable by AMF in 3GPP access, the AMF 114 starts the paging procedure by sending a paging message. Upon reception of paging request, the UE 302 may initiate a UE triggered service request procedure.

In a delivery 312 of UE policies, if the UE 302 is in CM-CONNECTED over 3GPP access or non-3GPP access, the AMF 114 transfers transparently the UE policy container (UE access selection and PDU session selection related policy information) received from the PCF 110 to the UE 302. The UE policy container may include the list of policy sections as described in 3GPP TS 23.503. The UE 302 updates the UE policy provided by the PCF 110 and sends the results 314 of the delivery of UE policies to the AMF 114.

If the AMF 114 received the UE policy container and the PCF 110 subscribed to be notified of the reception of the UE policy container then the AMF 114 forwards the response of the UE 302 to the PCF 110 using a Namf_N1MessageNotify operation 316. The PCF 110 maintains the latest list of PSIs delivered to the UE 302 and updates the latest list of PSIs in the UDR by invoking Nudr_DM_Update (SUPI, Policy Data, Policy Set Entry, updated PSI data) service operation.

3GPP TR 22.827 has two use cases for live audio production which presents key performance indicators (KPIs). However, the deployment of this use case in non-public network and assumes the audiences have subscription of the non-public network. In other words, existing solutions and use cases are limited in that they do not support potential audiences with UE devices that do not have a subscription with MNOs or other third parties.

Embodiments herein provide an A/V live production framework for 5GS to support different communication consumers, including subscribers of non-public network, as well as the subscribers of other MNOs/third parties (i.e., the live media production is a service that can be provided to other MNOs/third parties). Thus, the subscribers of the MNOs/third parties can also enjoy the live media service.

One embodiment disclosed herein provides a live media production function (LMPF) framework in 5GS. The LMPF may be deployed as a virtual/physical network function in 5G network. The LMPF may be an AF interfacing with a 5G network over a standardized interface. The operation of the LMPF may, in some embodiments, be temporary and for a limited time (e.g., the duration of the sport game). Other embodiments provide example procedures for using the framework.

Certain embodiments use the example of live immersive media production in sport arena or event in 5GS. However, the scope of this disclosure is not so limited and skilled persons will recognize from the disclosure herein that any type of live immersive media may be used. For example, the embodiments may be used for live media productions such as live concerts or live performances in the theaters or stadiums. Certain embodiments refer to the service architecture in 5G system as shown in 3GPP TS 23.503 FIG. 5.2.1-1 and FIG. 5.2.1-1a, as shown in FIG. 1 and FIG. 2 herein. In addition, or in other embodiments, the UE configuration update procedure is used for providing/updating UE configuration for a UE as a subscriber of a PLMN and non-public network.

Live Media Production Function

Figure 4:
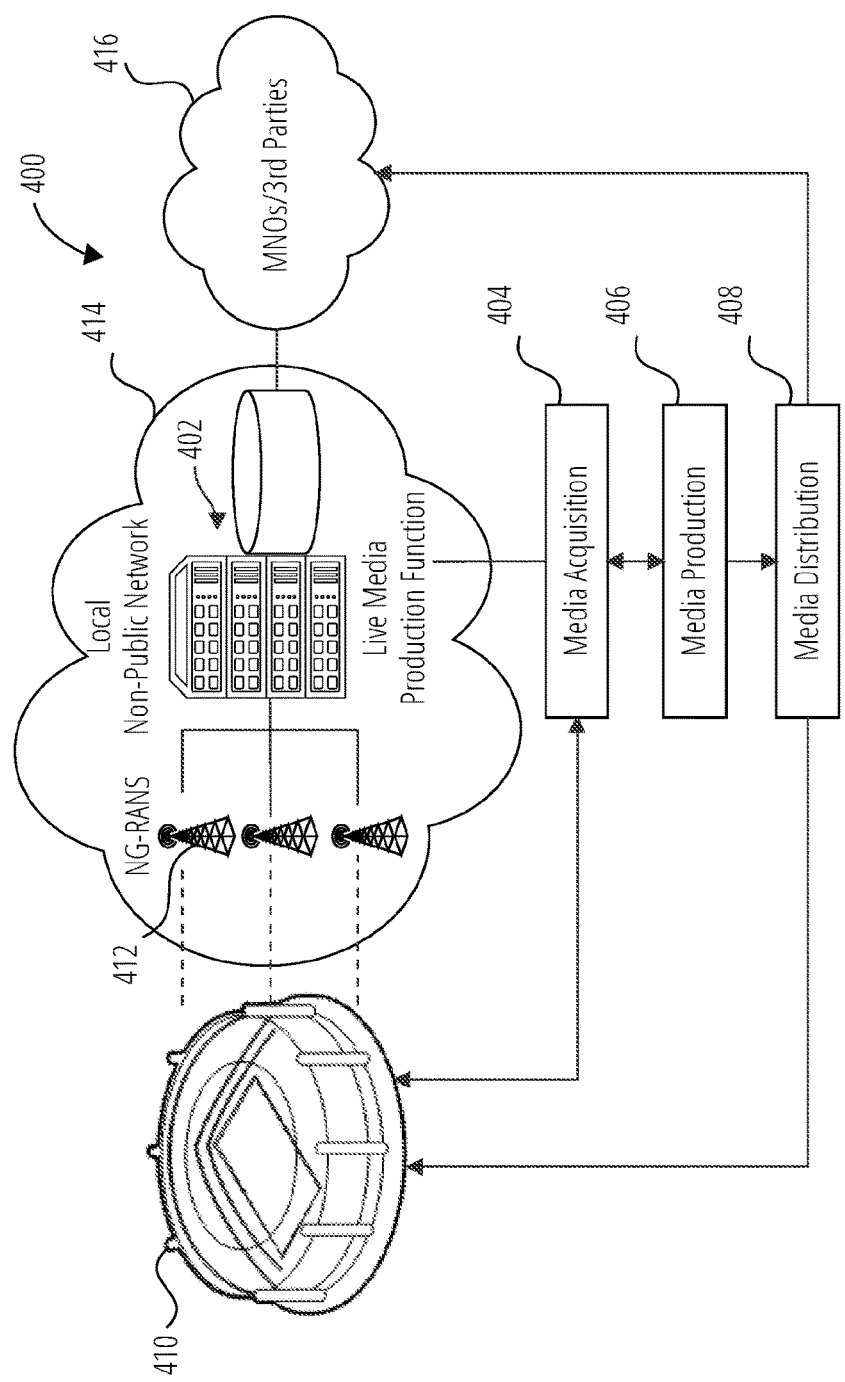
FIG. 4 illustrates an example immersive media production in accordance with one embodiment.

FIG. 4 is a block diagram illustrating an example immersive media production 400 using an LMPF 402 according to one embodiment. A real-time A/V production for live immersive media may include a media acquisition function 404, a media production function 406, and a media distribution function 408 to provision a live immersive media service at a sports stadium 410. By way of example only, and not by limitation, the stadium 410 may include thirty or more cameras with UE capabilities deployed around a playing field to capture video of athletes from multiple viewpoints. The cameras may be in communication to a 5G network via NG-RANs 412 in a local non-public network 414, which may be operated by MNOs/third parties 416.

The LMPF 402 can be deployed as a virtual/physical network function in the 5G network or as an AF interfacing with the 5G network over a standardized interface. The operation of the LMPF 402 may be temporary and for a limited time (e.g., the duration of the sport game).

The LMPF 402 produces live media and provides the produced live media to different customers, including other MNOs and third parties. That is, the LMPF 402 may be a communication service and the MNOs/third parties 416 may be the communication service consumers (CSCs). With the available media, the MNOs/third parties 416 may further provide communication services to their subscribers in their PLMNs or non-public networks.

Figure 5:
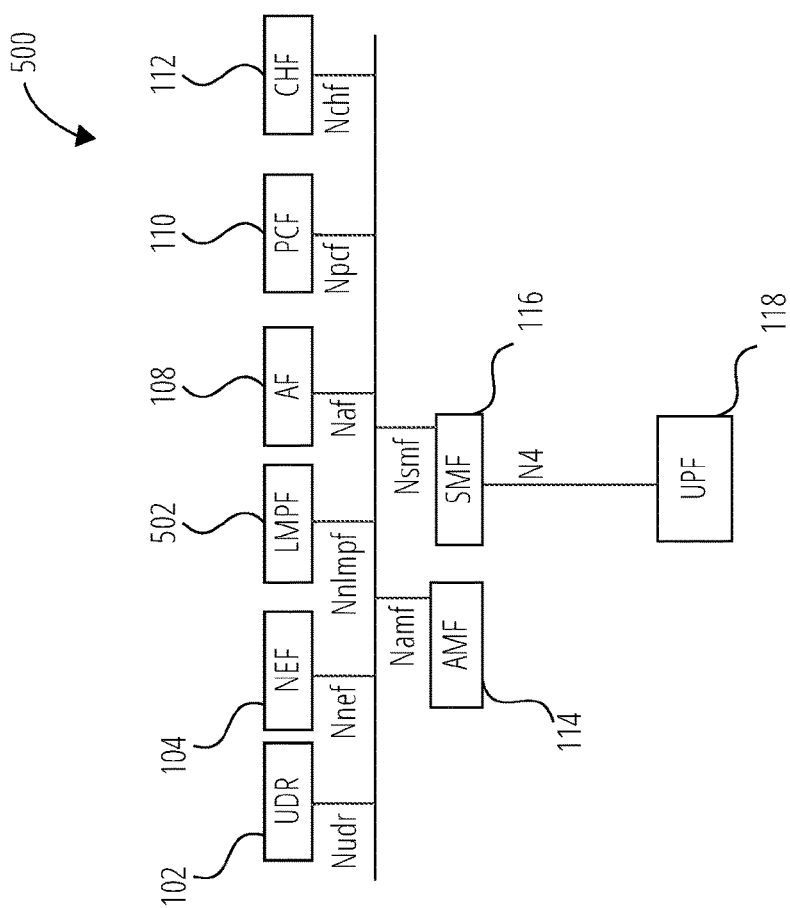
FIG. 5 illustrates an example architecture in accordance with one embodiment.

FIG. 5 illustrates an example architecture 500 including an LMPF 502 in the control plane according to one embodiment. In particular, FIG. 5 shows the LMPF 502 in the service based representation 100 example shown in FIG. 1. The LMPF 502 may be connected through, for example, an Nnlmpf interface.

Figure 6:
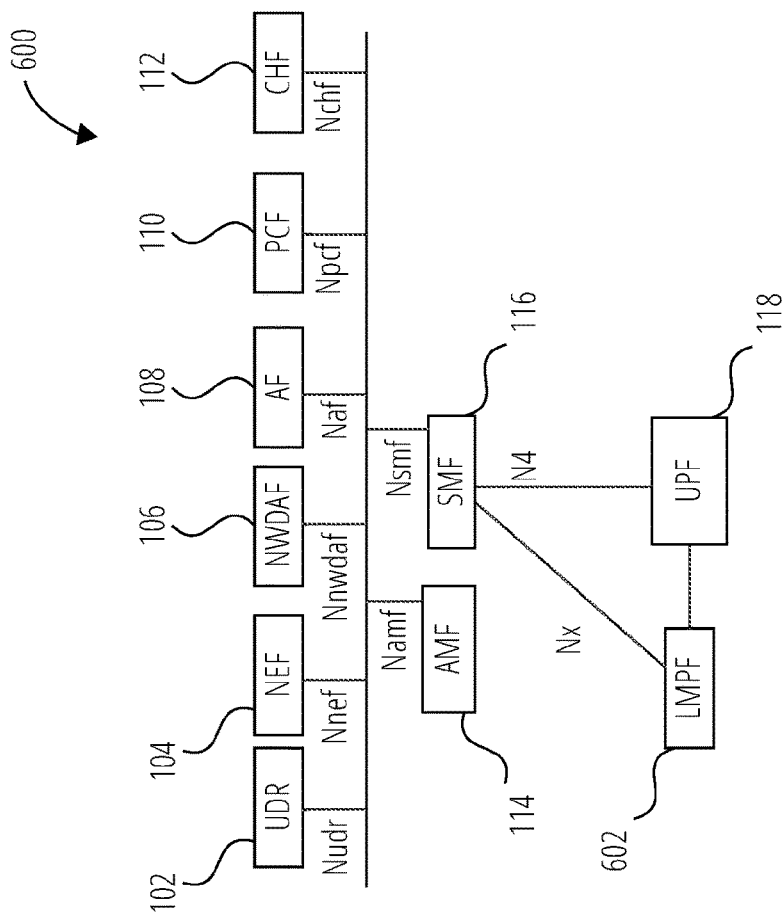
FIG. 6 illustrates another example architecture in accordance with one embodiment.

FIG. 6 illustrates an example architecture 600 including an LMPF 602 in a user plane according to another embodiment. FIG. 6 shows the LMPF 602 in the service based representation 100 shown in FIG. 1. In this example, the LMPF 602 may function as a UPF. The LMPF 602 may be connected through an Nx reference point.

In certain such embodiments, the communication service provider (CSP) deploys a RAN/CN infrastructure with physical/virtual network functions including an LMPF. The communication service customer (CSC) of the live media regards the LMPF as the virtual network function and provisions the live media service as the communication service provider (CSP-2) to their subscribers as communication service consumers (CSC-2).

In certain embodiments, the live media production function can be supported in a network slice in a PLMN/non-public network.

Table 1 shows an example business role model for the potential CSP and CSC of the network slice, indicated as CSP-NS and CSC-NS, for live media production. Also, CSP-2 and CSC-2 shows the role mode between the operator and its service subscriber (UE). The table demonstrates the concept of the network slice as a LMPF service concept, which allows more operators to provide services to their UE subscribers.

TABLE 1

| CSP-NS | CSC-NS | CSP-2 | CSC-2 |
| --- | --- | --- | --- |
| MNO | Other MNOs | MNO, and Other MNOs | UE |
| MNO | 3$^{rd}$ parties | MNO and 3$^{rd}$ parties | UE |
| 3$^{rd}$ Party | MNOs | 3$^{rd}$ parties and MNOs | UE |
| 3$^{rd}$ Party | 3$^{rd}$ parties | 3$^{rd}$ parties | UE |

In certain embodiments, the CSP of the LMPF provides APIs to its customers (e.g., MNOs, third parties), for the following functions: to request the live media service with required media types, media compression types, media related parameters, and its subscriber ID for LMPF service; to provide service authentication and authorization; to provide the security parameters for the media (e.g., integrity key, encryption key, encryption algorithms, etc.); to provide the access information, including network function address(s) (may be in another network function address depending on the deployment) or port number(s) for retrieving the live media.

Media Acquisition

In certain embodiments, to acquire media for the LMPF, entities/functions may include sensors, professional 360 degree cameras, a live media production function (LMPF) as a network function, and a 5G network infrastructure. In support of live immersive media production, it may be useful to capture as much live video from different angles and/or locations as possible. Therefore, the live media production function may be configured to remotely control the cameras and/or sensors in real-time whenever needed.

During LMPF setup as a network function, the LMPF provides deployment settings, and device configuration information to the PCF.

During operation, the LMPF initiates a monitoring event and report configuration request to the PCF. Based on the information of the devices, e.g. device identifier (ID), location, etc., the PCF uses a UE configuration update procedure (e.g., see FIGS. 3 and/or 3GPP TS 23.502 FIG. 4.2.4.3-1) to update the devices, e.g. sensors and camera, configuration.

The monitoring event may include, but is not limited to: location update criteria (e.g., by seconds, minutes, location changes, etc.); and device operation information (e.g., shooting angle, focus, zoom in/out percentages, black/white balance, video pixels setting, etc.) for the camera.

The monitoring report may be sent by the monitoring device to the LMPF via the PCF. The monitoring report may be an indications of a monitoring responding action. When the monitoring criteria is met, the device may automatically send a monitoring report including the reporting information. In addition, or in other embodiments, the monitoring responding action can be defined by the LMPF to request the device to take a specific action when detecting the monitoring event, which is to specify automation action at the device when detecting a specified monitoring event at the device. For example, when detecting a movement of a target that exceeds a specific area, the device moves along with the target automatically.

LMPF as an AF

In certain embodiments, the LMPF is configured as an AF interfacing with a 5G network over a standardized interface. The LMPF as an AF may produce live media and provide the live media to different customers, including other MNOs and third parties. That is, the LMPF is a communication service provider and the MNOs/third parties are the communication service consumer. With the available media, the MNOs/third parties can further provide communication services to their subscribers in their PLMN/non-public network.

Figure 7:
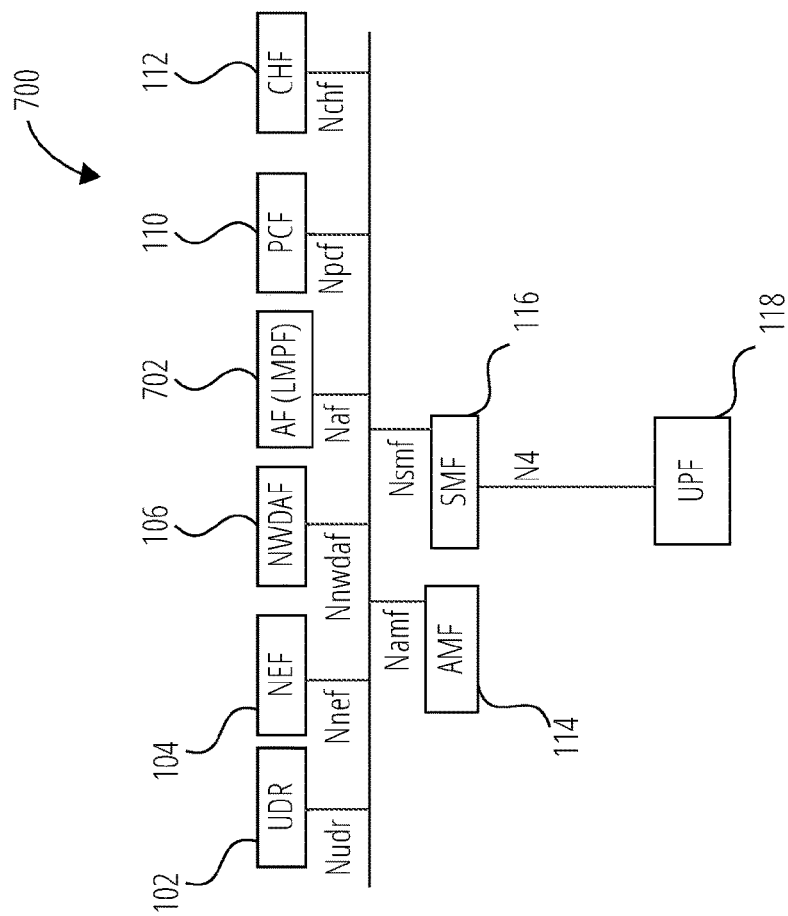
FIG. 7 illustrates another example architecture in accordance with one embodiment.

FIG. 7 illustrates another example architecture 700 including an LMPF as an AF 702 according to one embodiment. In particular, FIG. 7 shows the LMPF as an AF 702 in the service based representation 100 example shown in FIG. 1. In this example, the CSP deploys physical infrastructure and uses the NEF 104 to interface with LMPF as an AF 702. The operator of the LMPF may not be the same as the CSP which deploys the physical infrastructure. Thus, the CSP may be configured to provide the following APIs to the LMPF for LMPF services: to request for media acquisition service from the CSP with required media parameters with required media types, media compression types, media related parameters, and its subscriber ID; to request for media acquisition service from the CSP with required device configuration (e.g., camera shooting angles, resolutions, resolutions, number of cameras, etc.); to request for device monitoring/reporting services from internet of things (IoT) devices (e.g., the sensors and cameras); and/or to request for device parameters adjustments for the specific devices (e.g., camera) when conducting media acquisitions.

In certain such embodiments, if the CSP of the live media acquisition service would like to also be the customer of the produced live media from the LMPF, it may provide the APIs as a CSC of the live media service to receive the live media. The APIs may support the following messages: to obtain the live media service with required media types, media compression types, media related parameters, and its subscriber ID for LMPF service; to get service authentication and authorization; to get the security parameters for the media (e.g., integrity key, encryption key, encryption algorithms, etc.); and/or to get the access information, including LMPF function address(es) (e.g., may be in another address depending on the deployment) or port number(s) for retrieving the live media.

Media Production

In certain embodiments, when acquired media are available, the LMPF has logical functionalities to provide media content storage and as a media production console. For media content storage, the LMPF stores uploaded video streams/clips from the sensors and cameras for further production. The LMPF may store the live media after it is successfully processed and produced.

As a media production console, the LMPF may decide the actions of the monitoring IoT devices (e.g., cameras) and may send commands for dynamically adjusting parameters (e.g., for calibration and video shootings) of one or more cameras based on information provided by cameras and media production console. The monitoring features provided by the 5GS is used to configure the cameras and sensors for reporting specific events to the LMPF. Further, there may be different media production consoles to produce media for different subscribed services subject to different service requirements. For example, for provisioning immersive media for audiences at the scene, high throughput and low latency delivery of the live immersive media may be used. On the other hand, for remote audiences, which may allow relaxed latency requirements, the production of the media can be mixed with other media sources (e.g., reporting and advertisements).

Media Distribution

In certain embodiments, when the produced media is stored and ready to be provided by the LMPF to the audiences, the LMPF may provide media distribution for: an audience at the scene, which has service subscriptions to the non-public network or a private slice in the PLMN; and/or audiences at remote sites all over the world, which have service subscriptions from their service providers.

The LMPF may offer live media service by distributing it to the other operators (MNO/third parties) as service subscribers, if service agreements for the live media service are available. For example, there may be two methods to distribute the service. In a pull mode, the LMPF already configures and sets up the address and port to be accessed by the subscriber. The subscriber can retrieve the live media. The corresponding APIs are provided for the subscriber to retrieve the live media. In a push mode, the LMPF already has stored address and port information at the network of the subscribers. The LMPF can push the live media accordingly whenever available.

The LMPF may distribute content based on various service offerings. For example, dynamic adaptive streaming over HTTP (DASH) as defined in 3GPP TS 26.247 may be used, in which the LMPF includes a DASH server to distribute DASH-formatted live content using HTTP protocols. As another example, packet-switched streaming service (PSS) as defined in 3GPP TS 26.234 may be used, in which the LMPF includes a PSS server to distribute (i) DASH-formatted live content using HTTP protocols, or (ii) RTP-formatted live content using RTP protocols. As yet another example, multimedia broadcast and multicast service (MBMS) as defined in 3GPP TS 26.346 may be used, in which the LMPF includes a BMSC server to distribute (i) DASH-formatted live content using FLUTE protocols, or (ii) RTP-formatted live content using RTP protocols.

The LMPF may also receive live uplink content from the UE using the framework for live uplink streaming (FLUS) service as defined in 3GPP TS 26.238. In this case, the LMPF includes a FLUS sink and may receive (i) DASH-formatted live content using HTTP protocols or (ii) RTP-based live content based on multimedia telephony service over internet protocol (IP) multimedia subsystem (IMS) (MTSI), as defined in 3GPP TS 26.114.

The LMPF may distribute immersive live content formatted according to the omnidirectional media application formats (OMAF) defined in 3GPP TS 26.118.

Example Procedure

In one embodiment, a service flow in provisioning a live immersive media production for sport game comprises the following steps. A Step0 defines pre-conditions. To achieve communication of automation in a production system for producing real-time immersive media, different system deployments may be used depending on the types of the sports, the size of sport ground, number of athletes, the movement of the athletes, and the speed of movement. For example, for sports of Olympics games: a soccer game is with 14-22 players, includes fast and random movement (e.g. Gareth Bale's (Real Madrid) record was 36.9 km/h), and uses a field with dimensions of 110 m by 75 m; and a swimming game is with at least 8 swimmers, includes predictable straight movement, includes somewhat predictable speeds (e.g., Michael Phelps's freestyle record was 1:42.96 (1.94 m/sec)), and uses a pool with dimensions of 50 m by 25 m.

In a Step0.1, for sensors configuration and connectivity, athletes may wear sensors that include UE capabilities and are registered to the 5G network and connected with the LMPF. The UEs report location, speed, and/or movement and capture/upload live videos streams/clips to the 5G network. The identification information of the athletes and the corresponding sensors may be preconfigured and stored in LMPF.

A Step0.2 may be for professional video cameras with UE capabilities. The cameras may be registered to the 5G network, connected with CMPF, and perform UE configuration updates. The LMPF can perform cameras calibration remotely via PCF when receiving reporting information from sensors and cameras.

In a Step1, through 5G connection, sensors may start to report their location based on configured monitoring events, and optionally upload video clips. And cameras may start to upload live video based on configured specific area and operation parameters.

In a Step2, based on the received sensors' information and uploaded media from the cameras, the LMPF starts to produce live media by processing and combining all the videos information. Some post-production media (e.g., captions and live report) may be also combined during the production process.

In a Step3, the LMPF determines to adjust certain operation parameters for some cameras. The LMPF sends the commands to one or more specific cameras via PCF using the UE configuration update procedure. For example, the media production console may zoom in a camera to focus on a specific area or one particular athlete. The delivery of the commands and responded action is real-time so that it can capture the highlight scene (e.g., a touch down moment in football game).

In a Step4, when receiving messages from the LMPF, the camera executes actions based on received commands and camera parameters for operation of media acquisition (e.g., tracking object, a particular athlete at specific regions, shooting angle, focus, zoon in/out percentages, black/white balance, video pixels setting, etc.) For a camera with mobility capability (e.g., with wired track) or flying drones, the commands can include specific shooting geographical locations.

In a Step5, the LMPF produces real-time live media, stores it, and distributes it based on the request from the subscribers and the location of the audiences. The live immersive media service can be provided to the service subscribers, including: an audience at the scene wherein users have devices with UE capability and subscriptions for non-public network or private slice in a PLMN; and a remote audience not at the scene wherein users have viewing devices without UE capability and with subscriptions for the live streaming service of selective games from service providers including MNOs and third parties.

A Step6 may include post-conditions. For example, the live immersive media services for multiple sport games in Olympic are provisioning to audiences all over the world via 5G network during the whole Olympic time. The audiences at the scene or at remote location receive and enjoy the live immersive media.

Types of Network Deployments

In certain embodiments, the live immersive media production service in a 5G network can support LMPF (as a network function in 5GC or an AF) in two types of network deployments: in a private slice in a PLMN operated by a MNO or a third party operator; or in a non-public network which RAN/CN infrastructure is deployed by a third party using spectrum leased from one or more MNO(s) and operated as a RAN sharing network shared among one or more MNO(s) and third parties.

Example Methods

Figure 8:
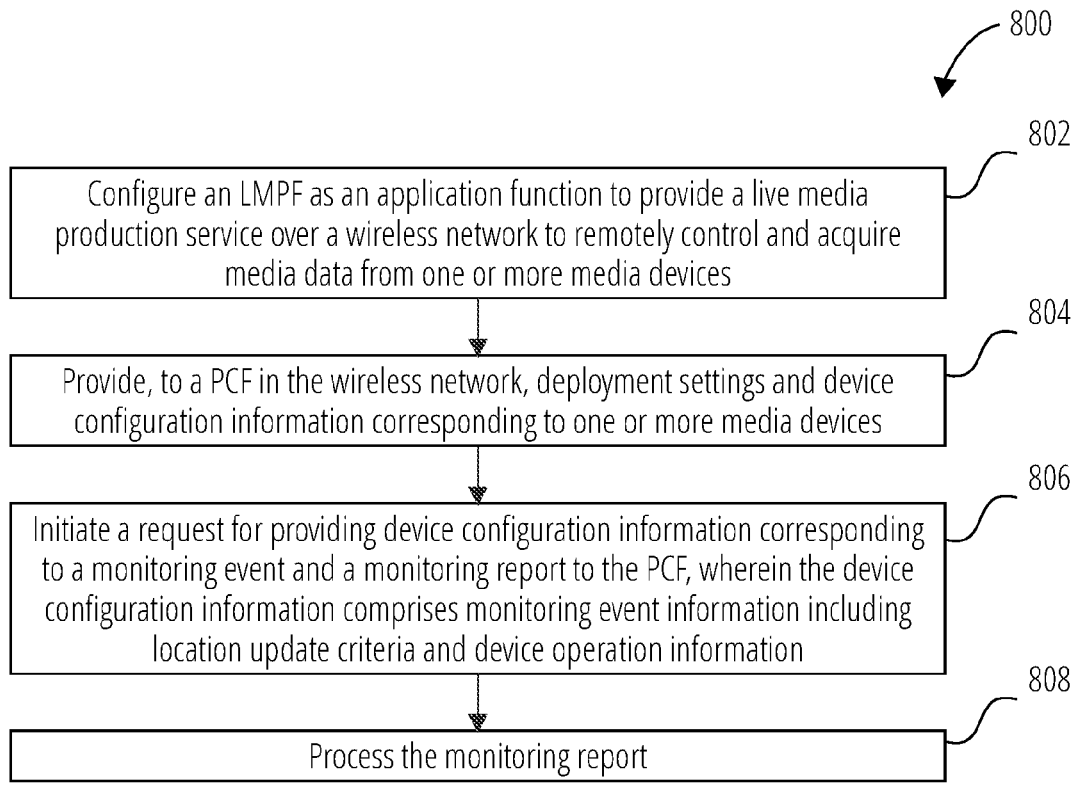
FIG. 8 is a flowchart illustrating method in accordance with one embodiment.

FIG. 8 is a flowchart illustrating a method 800 for a live media production function (LMPF) over a wireless network according to one embodiment. In block 802, the method 800 configures the LMPF as an application function to provide a live media production service over the wireless network to remotely control and acquire media data from one or more media devices. In block 804, the method 800 provides, to a PCF in the wireless network, deployment settings and device configuration information corresponding to the one or more media devices. In block 806, the method 800 initiates a request for providing the device configuration information corresponding to a monitoring event and a monitoring report to the PCF, wherein the device configuration information comprises monitoring event information including location update criteria and device operation information. In block 808, the method 800 processes the monitoring report comprising reporting information received from the one or more media devices through the PCF.

Figure 9:
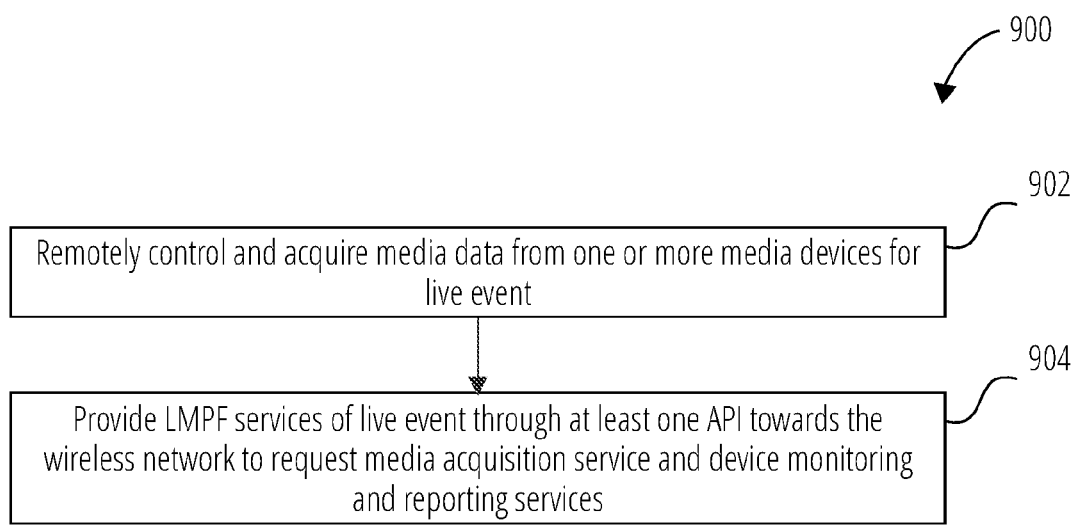
FIG. 9 is a flowchart illustrating a method in accordance with one embodiment.

FIG. 9 is a flowchart illustrating a method 900 for an AF to interface with a wireless network. In block 902, the method 900 remotely controls and acquires media data from one or more media devices for a live event. In block 904, the method 900 provides LMPF services of the live event through at least one API towards the wireless network to request media acquisition service and device monitoring and reporting services.

Example Systems and Apparatuses

Figure 10:
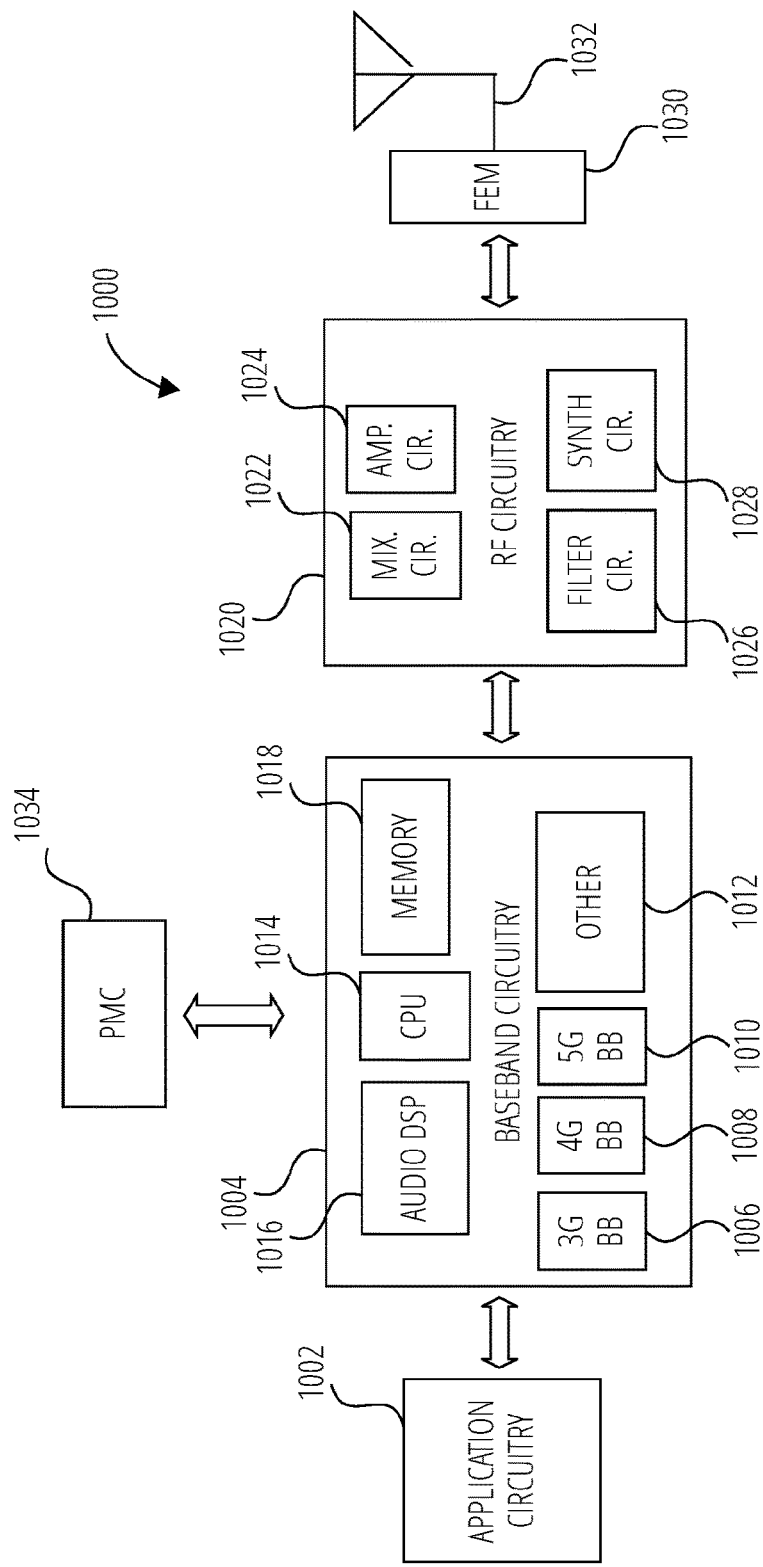
FIG. 10 illustrates a device in accordance with one embodiment.

FIG. 10 illustrates example components of a device 1000 in accordance with some embodiments. In some embodiments, the device 1000 may include application circuitry 1002, baseband circuitry 1004, Radio Frequency (RF) circuitry (shown as RF circuitry 1020), front-end module (FEM) circuitry (shown as FEM circuitry 1030), one or more antennas 1032, and power management circuitry (PMC) (shown as PMC 1034) coupled together at least as shown. The components of the illustrated device 1000 may be included in a UE or a RAN node. In some embodiments, the device 1000 may include fewer elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1020 and to generate baseband signals for a transmit signal path of the RF circuitry 1020. The baseband circuitry 1004 may interface with the application circuitry 1002 for generation and processing of the baseband signals and for controlling operations of the RF circuitry 1020. For example, in some embodiments, the baseband circuitry 1004 may include a third generation (3G) baseband processor (3G baseband processor 1006), a fourth generation (4G) baseband processor (4G baseband processor 1008), a fifth generation (5G) baseband processor (5G baseband processor 1010), or other baseband processor(s) 1012 for other existing generations, generations in development or to be developed in the future (e.g., second generation (2G), sixth generation (6G), etc.). The baseband circuitry 1004 (e.g., one or more of baseband processors) may handle various radio control functions that enable communication with one or more radio networks via the RF circuitry 1020. In other embodiments, some or all of the functionality of the illustrated baseband processors may be included in modules stored in the memory 1018 and executed via a Central Processing Unit (CPU 1014). The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include a digital signal processor (DSP), such as one or more audio DSP(s) 1016. The one or more audio DSP(s) 1016 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1004 is configured to support radio communications of more than one wireless protocol may be referred to as multi-mode baseband circuitry.

The RF circuitry 1020 may enable communication with wireless networks using modulated electromagnetic radiation through a non-solid medium. In various embodiments, the RF circuitry 1020 may include switches, filters, amplifiers, etc. to facilitate the communication with the wireless network. The RF circuitry 1020 may include a receive signal path which may include circuitry to down-convert RF signals received from the FEM circuitry 1030 and provide baseband signals to the baseband circuitry 1004. The RF circuitry 1020 may also include a transmit signal path which may include circuitry to up-convert baseband signals provided by the baseband circuitry 1004 and provide RF output signals to the FEM circuitry 1030 for transmission.

In some embodiments, the receive signal path of the RF circuitry 1020 may include mixer circuitry 1022, amplifier circuitry 1024 and filter circuitry 1026. In some embodiments, the transmit signal path of the RF circuitry 1020 may include filter circuitry 1026 and mixer circuitry 1022. The RF circuitry 1020 may also include synthesizer circuitry 1028 for synthesizing a frequency for use by the mixer circuitry 1022 of the receive signal path and the transmit signal path. In some embodiments, the mixer circuitry 1022 of the receive signal path may be configured to down-convert RF signals received from the FEM circuitry 1030 based on the synthesized frequency provided by synthesizer circuitry 1028. The amplifier circuitry 1024 may be configured to amplify the down-converted signals and the filter circuitry 1026 may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1022 of the receive signal path may comprise passive mixers, although the scope of the embodiments is not limited in this respect.

In some embodiments, the mixer circuitry 1022 of the transmit signal path may be configured to up-convert input baseband signals based on the synthesized frequency provided by the synthesizer circuitry 1028 to generate RF output signals for the FEM circuitry 1030. The baseband signals may be provided by the baseband circuitry 1004 and may be filtered by the filter circuitry 1026.

In some embodiments, the mixer circuitry 1022 of the receive signal path and the mixer circuitry 1022 of the transmit signal path may include two or more mixers and may be arranged for quadrature downconversion and upconversion, respectively. In some embodiments, the mixer circuitry 1022 of the receive signal path and the mixer circuitry 1022 of the transmit signal path may include two or more mixers and may be arranged for image rejection (e.g., Hartley image rejection). In some embodiments, the mixer circuitry 1022 of the receive signal path and the mixer circuitry 1022 may be arranged for direct downconversion and direct upconversion, respectively. In some embodiments, the mixer circuitry 1022 of the receive signal path and the mixer circuitry 1022 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1020 may include analog-to-digital converter (ADC) and digital-to-analog converter (DAC) circuitry and the baseband circuitry 1004 may include a digital baseband interface to communicate with the RF circuitry 1020.

In some dual-mode embodiments, a separate radio IC circuitry may be provided for processing signals for each spectrum, although the scope of the embodiments is not limited in this respect.

In some embodiments, the synthesizer circuitry 1028 may be a fractional-N synthesizer or a fractional N/N+1 synthesizer, although the scope of the embodiments is not limited in this respect as other types of frequency synthesizers may be suitable. For example, synthesizer circuitry 1028 may be a delta-sigma synthesizer, a frequency multiplier, or a synthesizer comprising a phase-locked loop with a frequency divider.

The synthesizer circuitry 1028 may be configured to synthesize an output frequency for use by the mixer circuitry 1022 of the RF circuitry 1020 based on a frequency input and a divider control input. In some embodiments, the synthesizer circuitry 1028 may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 (such as an applications processor) depending on the desired output frequency. In some embodiments, a divider control input (e.g., N) may be determined from a look-up table based on a channel indicated by the application circuitry 1002.

Synthesizer circuitry 1028 of the RF circuitry 1020 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1028 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1020 may include an IQ/polar converter.

The FEM circuitry 1030 may include a receive signal path which may include circuitry configured to operate on RF signals received from one or more antennas 1032, amplify the received signals and provide the amplified versions of the received signals to the RF circuitry 1020 for further processing. The FEM circuitry 1030 may also include a transmit signal path which may include circuitry configured to amplify signals for transmission provided by the RF circuitry 1020 for transmission by one or more of the one or more antennas 1032. In various embodiments, the amplification through the transmit or receive signal paths may be done solely in the RF circuitry 1020, solely in the FEM circuitry 1030, or in both the RF circuitry 1020 and the FEM circuitry 1030.

In some embodiments, the FEM circuitry 1030 may include a TX/RX switch to switch between transmit mode and receive mode operation. The FEM circuitry 1030 may include a receive signal path and a transmit signal path. The receive signal path of the FEM circuitry 1030 may include an LNA to amplify received RF signals and provide the amplified received RF signals as an output (e.g., to the RF circuitry 1020). The transmit signal path of the FEM circuitry 1030 may include a power amplifier (PA) to amplify input RF signals (e.g., provided by the RF circuitry 1020), and one or more filters to generate RF signals for subsequent transmission (e.g., by one or more of the one or more antennas 1032).

In some embodiments, the PMC 1034 may manage power provided to the baseband circuitry 1004. In particular, the PMC 1034 may control power-source selection, voltage scaling, battery charging, or DC-to-DC conversion. The PMC 1034 may often be included when the device 1000 is capable of being powered by a battery, for example, when the device 1000 is included in a UE. The PMC 1034 may increase the power conversion efficiency while providing desirable implementation size and heat dissipation characteristics.

FIG. 10 shows the PMC 1034 coupled only with the baseband circuitry 1004. However, in other embodiments, the PMC 1034 may be additionally or alternatively coupled with, and perform similar power management operations for, other components such as, but not limited to, the application circuitry 1002, the RF circuitry 1020, or the FEM circuitry 1030.

In some embodiments, the PMC 1034 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used to execute Layer 3, Layer 2, or Layer 1 functionality, while processors of the application circuitry 1002 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
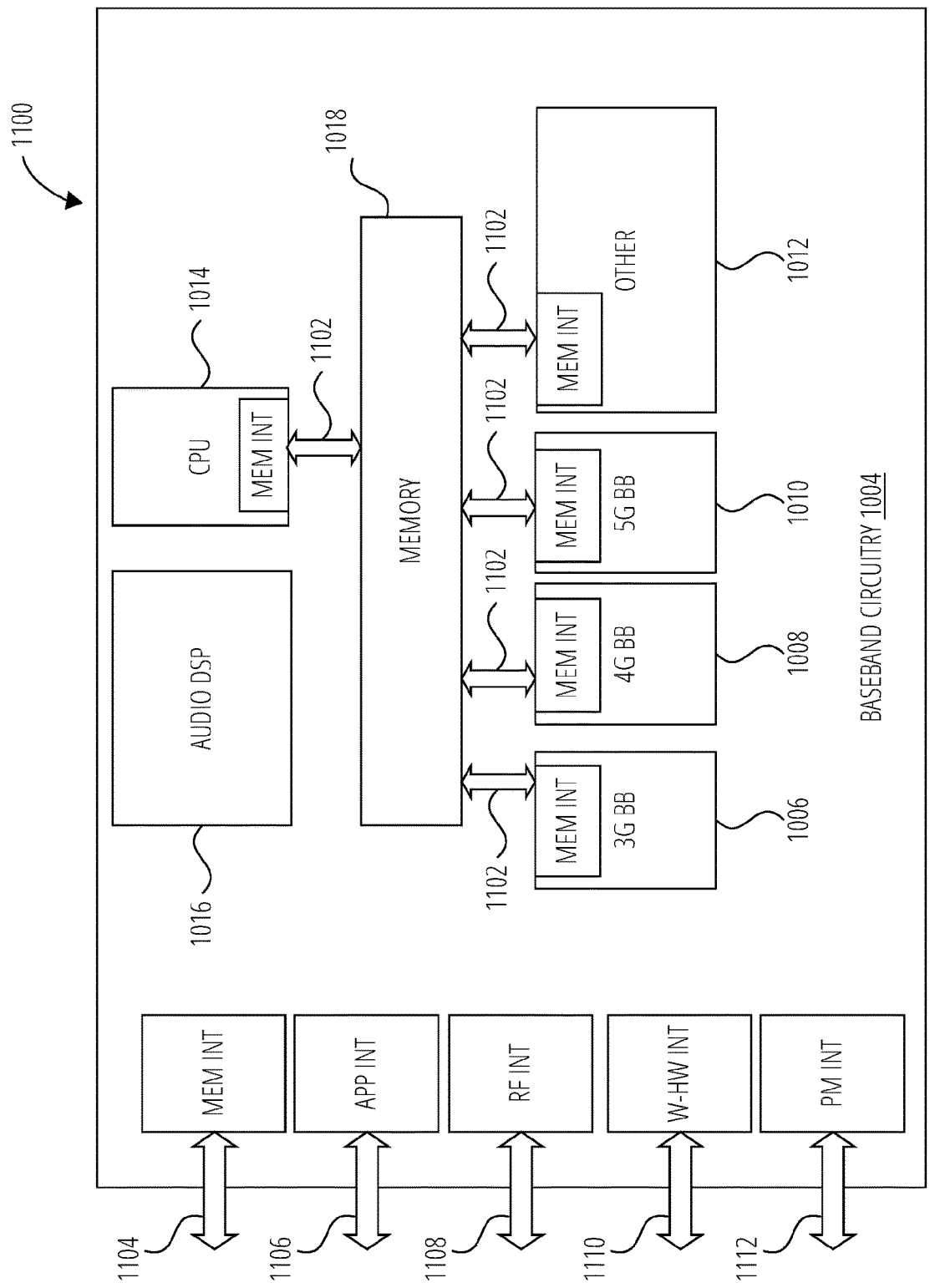
FIG. 11 illustrates example interfaces in accordance with one embodiment.

FIG. 11 illustrates example interfaces 1100 of baseband circuitry in accordance with some embodiments. As discussed above, the baseband circuitry 1004 of FIG. 10 may comprise 3G baseband processor 1006, 4G baseband processor 1008, 5G baseband processor 1010, other baseband processor(s) 1012, CPU 1014, and a memory 1018 utilized by said processors. As illustrated, each of the processors may include a respective memory interface 1102 to send/receive data to/from the memory 1018.

The baseband circuitry 1004 may further include one or more interfaces to communicatively couple to other circuitries/devices, such as a memory interface 1104 (e.g., an interface to send/receive data to/from memory external to the baseband circuitry 1004), an application circuitry interface 1106 (e.g., an interface to send/receive data to/from the application circuitry 1002 of FIG. 10), an RF circuitry interface 1108 (e.g., an interface to send/receive data to/from RF circuitry 1020 of FIG. 10), a wireless hardware connectivity interface 1110 (e.g., an interface to send/receive data to/from Near Field Communication (NFC) components, Bluetooth® components (e.g., Bluetooth® Low Energy), Wi-Fi® components, and other communication components), and a power management interface 1112 (e.g., an interface to send/receive power or control signals to/from the PMC 1034.

Figure 12:
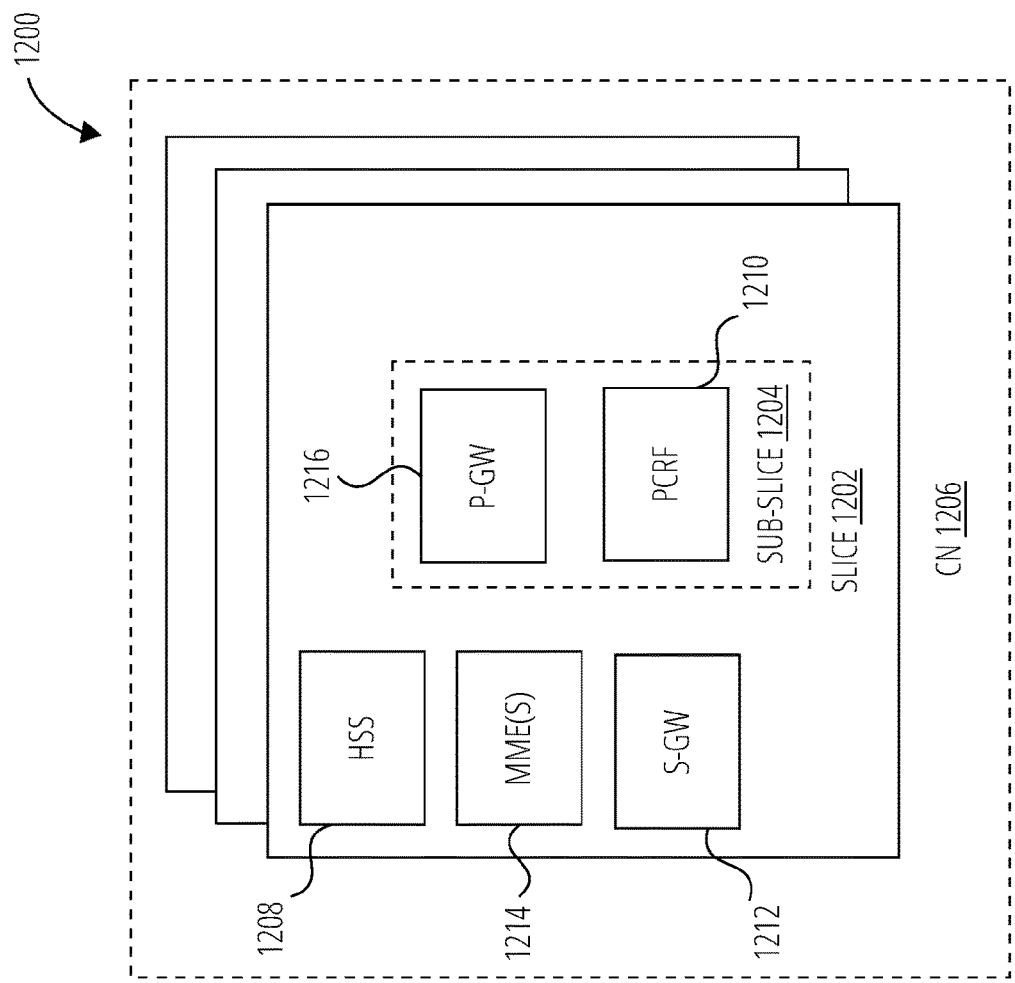
FIG. 12 illustrates components in accordance with one embodiment.

FIG. 12 illustrates components 1200 of a core network in accordance with some embodiments. The components of the CN 1206 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1206 may be referred to as a network slice 1202 (e.g., the network slice 1202 is shown to include the HSS 1208, the MME(s) 1214, and the S-GW 1212). A logical instantiation of a portion of the CN 1206 may be referred to as a network sub-slice 1204 (e.g., the network sub-slice 1204 is shown to include the P-GW 1216 and the PCRF 1210).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
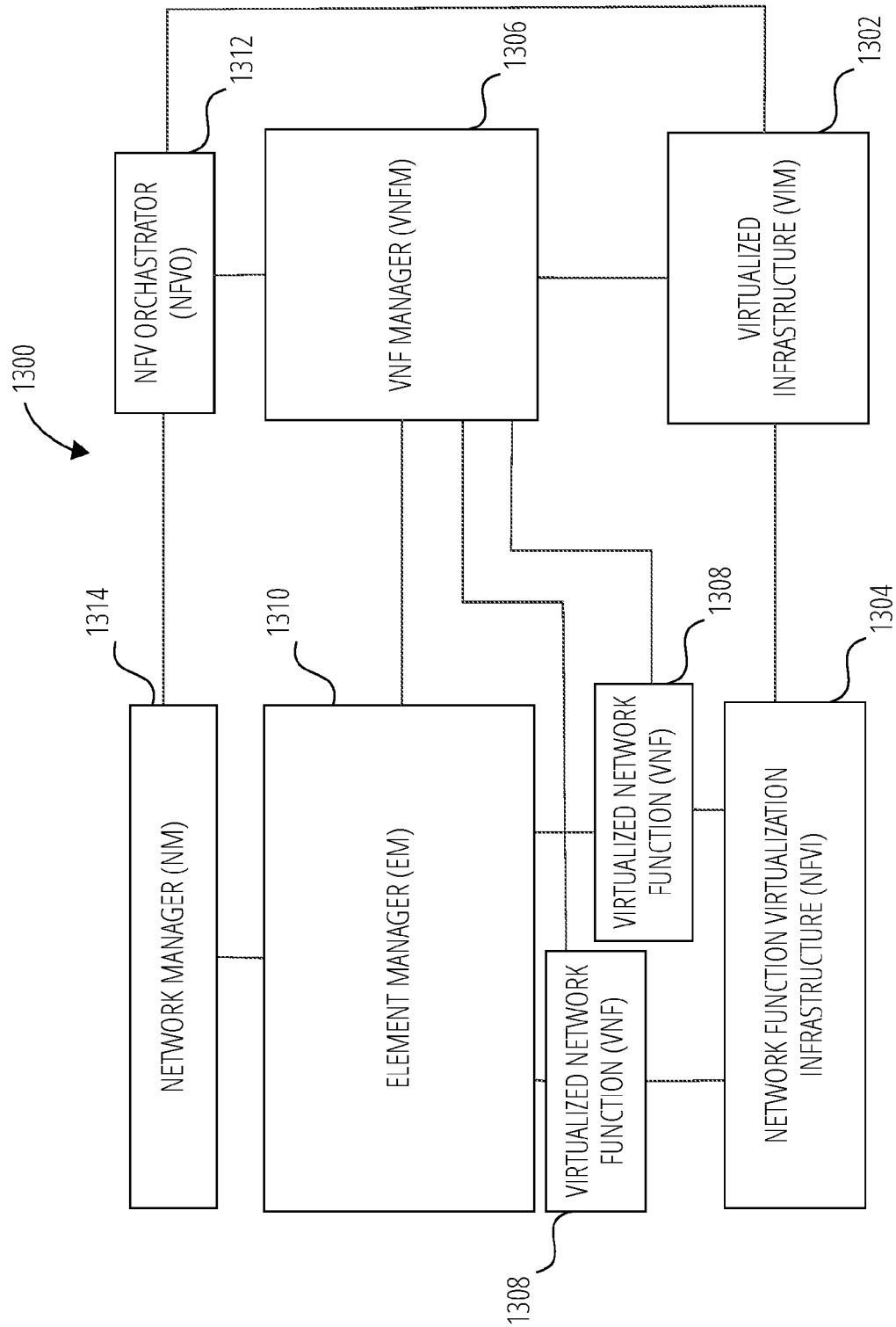
FIG. 13 illustrates a system in accordance with one embodiment.

FIG. 13 is a block diagram illustrating components, according to some example embodiments, of a system 1300 to support NFV. The system 1300 is illustrated as including a virtualized infrastructure manager (shown as VIM 1302), a network function virtualization infrastructure (shown as NFVI 1304), a VNF manager (shown as VNFM 1306), virtualized network functions (shown as VNF 1308), an element manager (shown as EM 1310), an NFV Orchestrator (shown as NFVO 1312), and a network manager (shown as NM 1314).

The VIM 1302 manages the resources of the NFVI 1304. The NFVI 1304 can include physical or virtual resources and applications (including hypervisors) used to execute the system 1300. The VIM 1302 may manage the life cycle of virtual resources with the NFVI 1304 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1306 may manage the VNF 1308. The VNF 1308 may be used to execute EPC components/functions. The VNFM 1306 may manage the life cycle of the VNF 1308 and track performance, fault and security of the virtual aspects of VNF 1308. The EM 1310 may track the performance, fault and security of the functional aspects of VNF 1308. The tracking data from the VNFM 1306 and the EM 1310 may comprise, for example, performance measurement (PM) data used by the VIM 1302 or the NFVI 1304. Both the VNFM 1306 and the EM 1310 can scale up/down the quantity of VNFs of the system 1300.

The NFVO 1312 may coordinate, authorize, release and engage resources of the NFVI 1304 in order to provide the requested service (e.g., to execute an EPC function, component, or slice). The NM 1314 may provide a package of end-user functions with the responsibility for the management of a network, which may include network elements with VNFs, non-virtualized network functions, or both (management of the VNFs may occur via the EM 1310).

Figure 14:
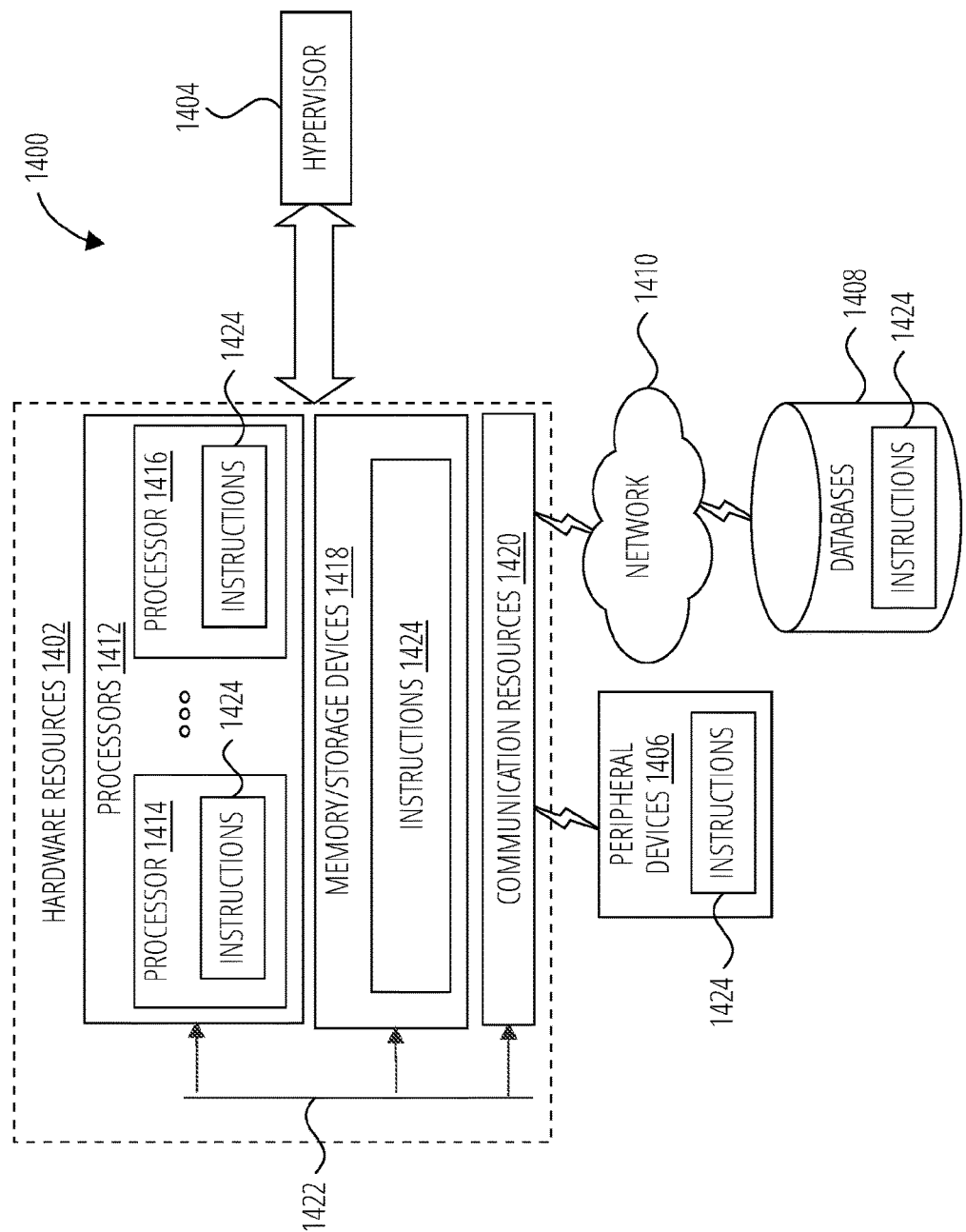
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e.g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a non-transitory computer-readable storage medium. The computer-readable storage medium includes instructions that when executed by a processor, cause the processor to perform a method for a live media production function (LMPF) over a wireless network. The method includes: configuring the LMPF as an application function to provide a live media production service over the wireless network to remotely control and acquire media data from one or more media devices; providing, to a policy control function (PCF) in the wireless network, deployment settings and device configuration information corresponding to the one or more media devices; and initiating a request for providing the device configuration information corresponding to a monitoring event and a monitoring report to the PCF, wherein the device configuration information comprises monitoring event information including location update criteria and device operation information.

Example 2 is the computer-readable storage medium of Example 1, the method further comprising processing the monitoring report comprising reporting information received from the one or more media devices through the PCF.

Example 3 is the computer-readable storage medium of Example 2, wherein the monitoring report comprises an indication of a triggered monitoring response action when a monitoring criteria of the monitoring event is met by the one or more media devices.

Example 4 is the computer-readable storage medium of Example 1, wherein the PCF generates a request for a UE configuration update for the one or more media devices to configure the monitoring event, the monitoring report, and a monitoring response action wherein upon detection of a specified monitoring event at the one or more media devices the monitoring report is sent, and wherein the monitoring response action comprises an automation action executed by the one or more media devices.

Example 5 is the computer-readable storage medium of Example 1, wherein the one or more media devices are selected from a group comprising an internet of things (IoT) device, a camera, and a sensor.

Example 6 is the computer-readable storage medium of Example 1, wherein the deployment settings and the device configuration information comprise a device identifier (ID) and a corresponding device location.

Example 7 is the computer-readable storage medium of Example 1, wherein the device operation information includes shooting angle, focus, zoom in and out percentages, black or white balance, and video pixel settings.

Example 8 is the computer-readable storage medium of Example 1, wherein the LMPF comprises a physical or virtual network function in a control plane or a user plane to interface with the wireless network, the method further comprising providing produced live media to one or more communication service consumers including at least one of a mobile network operator (MNO) and a third party service provider.

Example 9 is a method for an application function (AF) to interface with a wireless network. The method includes: remotely controlling and acquiring media data from one or more media devices for a live event; and providing live media production function (LMPF) services of the live event through at least one application programming interface (API) towards the wireless network to request media acquisition service and device monitoring and reporting services.

Example 10 is the method of Example 9, wherein the at least one API is to request for media acquisition service from the wireless network, the request comprising media parameters including media types, media compression types, media related parameters, and a subscriber identifier (ID) of a communication service provider.

Example 11 is the method of Example 9, wherein the at least one API is to request for media acquisition service from the wireless network, the request comprising a device configuration for the one or more media devices using a UE configuration procedure initiated by a policy control function (PCF) in the wireless network.

Example 12 is the method of Example 11, wherein the device configuration includes at least one of camera shooting angles, video resolutions, and number of cameras.

Example 13 is the method of Example 12, wherein the at least one API is to request for device parameter adjustments for device configuration of the one or more media devices when conducting media acquisitions.

Example 14 is the method of Example 13, wherein the one or more media devices comprise at least one of cameras and sensors.

Example 15 is the method of Example 9, wherein the one or more media devices are internet of things (IoT) devices, and wherein the at least one API is to process a request for configuration service for configuring a monitoring event, a monitoring report, and a monitoring response action towards the IoT devices via a UE configuration update procedure initiated by a policy control function (PCF), wherein upon detection of a specified monitoring event at the one or more media devices, the monitoring report is sent and the monitoring response action is an automation action executed by the one or more media devices.

Example 16 is the method of Example 9, wherein the at least one API is further to provide live media streaming services for the wireless network as a consumer with requested media types, media compression types, media related parameters, and a subscriber identifier (ID) of a customer for the LMPF services.

Example 17 is the method of Example 16, wherein the at least one API is to provide security parameters for live media provided to one or more operator as a consumer of the LMPF services, the security parameters including at least one of an integrity key, an encryption key, and an encryption algorithm.

Example 18 is the method of Example 16, wherein the at least one API is to provide access information including one or more of a live media server address and port number for providing live media.

Example 19 is the method of Example 9, wherein the at least one API is to request service authentication and authorization for the wireless network to enable support of the LMPF services.

Example 20 is the method of Example 19, wherein the at least one API requests to enable the support of the LMPF services provided by the AF to one or more operator based on service agreements.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A non-transitory computer-readable storage medium, the computer-readable storage medium including instructions that when executed by a processor, cause the processor to perform a method for a live media production function (LMPF) over a wireless network, the method comprising:
configuring the LMPF as an application function to provide a live media production service over the wireless network to remotely control and acquire media data from one or more media devices;
providing, to a policy control function (PCF) in the wireless network, deployment settings and device configuration information corresponding to the one or more media devices; and
initiating a request for providing the device configuration information corresponding to a monitoring event and a monitoring report to the PCF, wherein the device configuration information comprises monitoring event information including:
location update criteria comprising commands for automatic geographic location changes, in response to detecting the monitoring event, of the one or more media devices comprising a camera with mobility capability; and
device operation information comprising a shooting angle for the camera.

2. The non-transitory computer-readable storage medium of claim 1, the method further comprising processing the monitoring report comprising reporting information received from the one or more media devices through the PCF.

3. The non-transitory computer-readable storage medium of claim 2, wherein the monitoring report comprises an indication of a triggered monitoring response action when a monitoring criteria of the monitoring event is met by the one or more media devices.

4. The non-transitory computer-readable storage medium of claim 1, wherein the PCF generates a request for a UE configuration update for the one or more media devices to configure the monitoring event, the monitoring report, and a monitoring response action wherein upon detection of a specified monitoring event at the one or more media devices the monitoring report is sent, and wherein the monitoring response action comprises an automation action executed by the one or more media devices.

5. The non-transitory computer-readable storage medium of claim 1, wherein the one or more media devices are selected from a group comprising an internet of things (IoT) device, the camera, and a sensor.

6. The non-transitory computer-readable storage medium of claim 1, wherein the deployment settings and the device configuration information comprise a device identifier (ID) and a corresponding device location.

7. The non-transitory computer-readable storage medium of claim 1, wherein the device operation information includes focus, zoom in and out percentages, black or white balance, and video pixel settings.

8. The non-transitory computer-readable storage medium of claim 1, wherein the LMPF comprises a physical or virtual network function in a control plane or a user plane to interface with the wireless network, the method further comprising providing produced live media to one or more communication service consumers including at least one of a mobile network operator (MNO) and a third party service provider.

9. A method for an application function (AF) to interface with a wireless network, the method comprising:
   remotely controlling and acquiring media data from one or more media devices for a live event; and
   providing live media production function (LMPF) services of the live event through at least one application programming interface (API) towards the wireless network to request media acquisition service and device monitoring and reporting services,
   wherein the at least one API is to process a request for configuration service for configuring a monitoring event and a monitoring report, and
   wherein the at least one API is to request for media acquisition service from the wireless network, the request comprising a device configuration for the one or more media devices using a UE configuration procedure initiated by a policy control function (PCF) in the wireless network, the device configuration comprising commands for automatic location changes, in response to detecting the monitoring event during the live event, of the one or more media devices comprising a camera with mobility capability.

10. The method of claim 9, wherein the at least one API is to request for media acquisition service from the wireless network, the request comprising media parameters including media types, media compression types, media related parameters, and a subscriber identifier (ID) of a communication service provider.

11. The method of claim 9, wherein the device configuration includes at least one of camera shooting angles, video resolutions, and number of cameras.

12. The method of claim 11, wherein the at least one API is to request for device parameter adjustments for device configuration of the one or more media devices when conducting media acquisitions.

13. The method of claim 12, wherein the one or more media devices further comprises one or more sensors.

14. The method of claim 9, wherein the one or more media devices are internet of things (IoT) devices, and wherein the at least one API is to process the request for configuration service for configuring the monitoring event, the monitoring report, and a monitoring response action towards the IoT devices via a UE configuration update procedure initiated by a policy control function (PCF), wherein upon detection of a specified monitoring event at the one or more media devices, the monitoring report is sent and the monitoring response action is an automation action executed by the one or more media devices.

15. The method of claim 9, wherein the at least one API is further to provide live media streaming services for the wireless network as a consumer with requested media types, media compression types, media related parameters, and a subscriber identifier (ID) of a customer for the LMPF services.

16. The method of claim 15, wherein the at least one API is to provide security parameters for live media provided to one or more operator as a consumer of the LMPF services, the security parameters including at least one of an integrity key, an encryption key, and an encryption algorithm.

17. The method of claim 15, wherein the at least one API is to provide access information including one or more of a live media server address and port number for providing the live media streaming services.

18. The method of claim 9, wherein the at least one API is to request service authentication and authorization for the wireless network to enable support of the LMPF services.

19. The method of claim 18, wherein the at least one API requests to enable the support of the LMPF services provided by the AF to one or more operator based on service agreements.

* * * * *